(12) United States Patent
Chen et al.

(10) Patent No.: US 10,664,268 B2
(45) Date of Patent: May 26, 2020

(54) DATA STORAGE OPTIMIZATION USING REPLICATION STATISTICS TO AUTOMATICALLY GENERATE NVME STREAM IDENTIFIERS

(71) Applicant: EMC IP Holding Company LLC, Hopkinton, MA (US)

(72) Inventors: Xiangping Chen, Sherborn, MA (US); Junping Zhao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 2 days.

(21) Appl. No.: 16/169,202

(22) Filed: Oct. 24, 2018

(65) Prior Publication Data

US 2020/0133668 A1 Apr. 30, 2020

(51) Int. Cl.
  *G06F 16/27* (2019.01)
  *G06F 9/30* (2018.01)
  *G06F 3/06* (2006.01)
  *G06F 16/13* (2019.01)

(52) U.S. Cl.
  CPC .............. *G06F 9/30* (2013.01); *G06F 3/065* (2013.01); *G06F 3/067* (2013.01); *G06F 3/0626* (2013.01); *G06F 16/137* (2019.01); *G06F 16/273* (2019.01)

(58) Field of Classification Search
  CPC .................................. G06F 16/273; G06F 16/27
  See application file for complete search history.

(56) References Cited

U.S. PATENT DOCUMENTS

| 7,475,124 | B2 | 1/2009 | Jiang et al. |
|---|---|---|---|
| 8,327,103 | B1 | 12/2012 | Can et al. |
| 8,380,928 | B1 | 2/2013 | Chen et al. |
| 8,429,346 | B1 | 4/2013 | Chen et al. |
| 8,515,911 | B1 | 8/2013 | Zhou et al. |
| 8,539,148 | B1 | 9/2013 | Chen et al. |
| 8,566,483 | B1 | 10/2013 | Chen et al. |
| 8,583,607 | B1 | 11/2013 | Chen et al. |
| 8,683,153 | B1 | 3/2014 | Long et al. |
| 8,712,976 | B1 | 4/2014 | Chen et al. |
| 8,775,388 | B1 | 7/2014 | Chen et al. |
| 8,782,324 | B1 | 7/2014 | Chen et al. |
| 8,799,601 | B1 | 8/2014 | Chen et al. |

(Continued)

OTHER PUBLICATIONS

U.S. Appl. No. 16/048,767, filed Jul. 30, 2018, Chen et al.

(Continued)

*Primary Examiner* — Edward J Dudek, Jr.
(74) *Attorney, Agent, or Firm* — Daly, Crowley, Mofford & Durkee, LLP

(57) ABSTRACT

An aspect of optimizing storage of data in a data replication system includes, for a plurality of write requests received from a source site, determining transfer statistics corresponding to each of the write requests and updating a table with the transfer statistics. An aspect also includes grouping pages in the table having common transfer statistics, assigning a unique non-volatile memory express (NVMe) stream identifier (ID) to each of the groups, and identifying grouped pages based on the assigned NVMe stream ID. An aspect further includes selecting a storage optimization technique for each of the groups based on the common transfer statistics and storing data of the write requests for each of the groups according to the selected optimization technique.

14 Claims, 10 Drawing Sheets

(56) References Cited

U.S. PATENT DOCUMENTS

| | | |
|---|---|---|
| 8,909,887 B1 | 12/2014 | Armangau et al. |
| 8,930,746 B1 | 1/2015 | Chen et al. |
| 8,954,699 B1 | 2/2015 | Chen et al. |
| 8,977,812 B1 | 3/2015 | Chen et al. |
| 9,152,336 B1 | 10/2015 | Chen et al. |
| 9,208,162 B1 | 12/2015 | Hallak et al. |
| 9,304,889 B1 | 4/2016 | Chen et al. |
| 9,355,112 B1 | 5/2016 | Armangau et al. |
| 9,378,106 B1 | 6/2016 | Ben-Moshe et al. |
| 9,384,206 B1 | 7/2016 | Bono et al. |
| 9,395,937 B1 | 7/2016 | Si et al. |
| 9,396,243 B1 | 7/2016 | Halevi et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,684,593 B1 | 6/2017 | Chen et al. |
| 9,710,187 B1 | 7/2017 | Si et al. |
| 9,811,288 B1 | 11/2017 | Chen et al. |
| 9,817,766 B1 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,176,046 B1 | 1/2019 | Hu et al. |
| 10,216,423 B1 * | 2/2019 | Malwankar ............ G06F 3/061 |
| 10,235,066 B1 | 3/2019 | Chen et al. |
| 2019/0034120 A1 * | 1/2019 | Barczak ................ G06F 3/0659 |
| 2019/0095107 A1 * | 3/2019 | Wysoczanski ........ G06F 3/0631 |
| 2019/0121742 A1 * | 4/2019 | Bhimani ............ G06F 12/0888 |
| 2019/0155521 A1 * | 5/2019 | Bahirat .................. G06F 3/061 |
| 2019/0189167 A1 * | 6/2019 | Suhler ................ G06F 12/0804 |

OTHER PUBLICATIONS

U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 15/076,775, filed Mar. 22, 2016, Chen et al.
U.S. Appl. No. 15/085,188, filed Mar. 30, 2016, Meiri et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 15/885,027, filed Jan. 31, 2018, Chen et al.
U.S. Appl. No. 16/042,363, filed Jul. 23, 2018, Chen et al.
U.S. Appl. No. 16/038,543, filed Jul. 18, 2018, Chen et al.

* cited by examiner

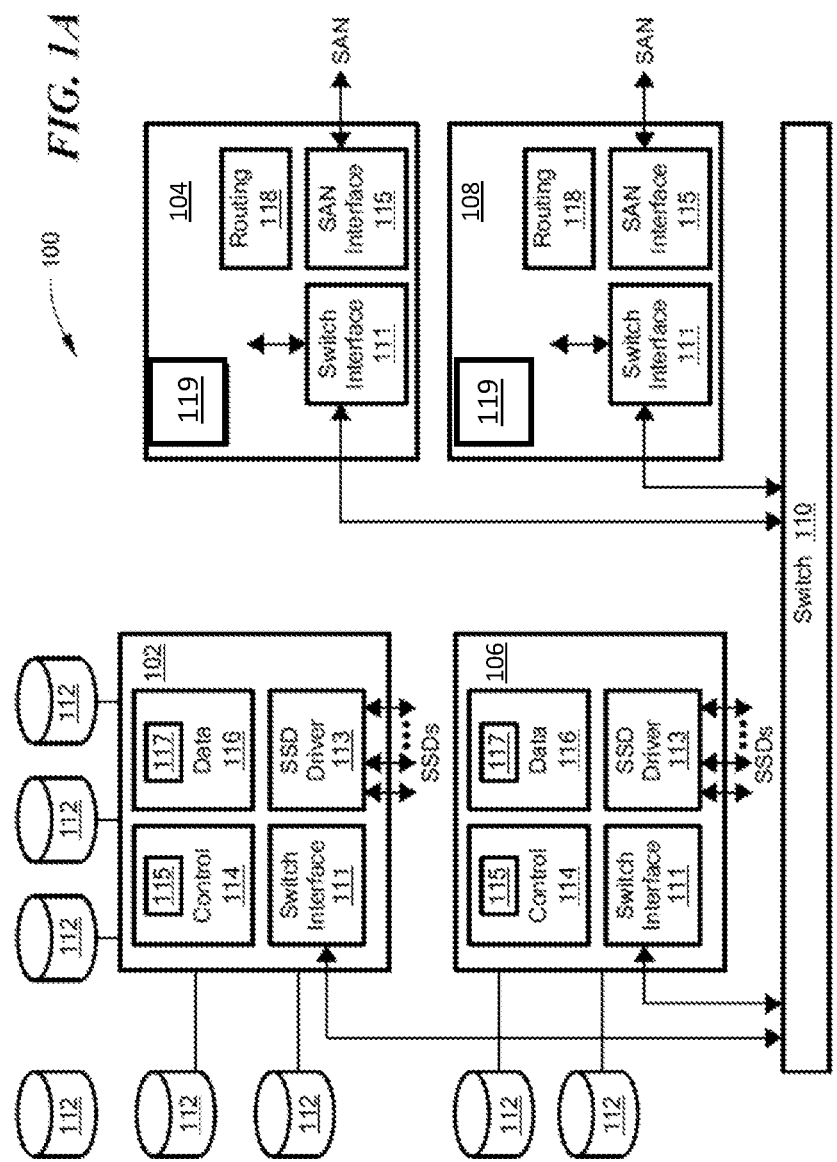

FIG. 7

| ADDRESS RANGE $_{702}$ | UPDATE FREQUENCY $_{704}$ | UPDATE TIMESTAMP $_{706}$ | STREAM ID $_{708}$ |
|---|---|---|---|
| PAGE 1 RANGE | 36 | 08:30:18 10:02 | 1 |
| PAGE 2 RANGE | 11 | 01:15:18 15:40 | 2 |
| PAGE 3 RANGE | 4 | 08:30:18 07:05 | 3 |
| PAGE 4 RANGE | 29 | 08:31:18 04:00 | 1 |
| PAGE 5 RANGE | 28 | 08:29:18 21:10 | 1 |
| PAGE 6 RANGE | 7 | 07:12:18 09:00 | 3 |
| PAGE n RANGE | 14 | 08:15:18 16:00 | 2 |

700

DATA STORAGE OPTIMIZATION USING REPLICATION STATISTICS TO AUTOMATICALLY GENERATE NVME STREAM IDENTIFIERS

BACKGROUND

Storage systems provide content-based deduplicated data storage in which data block addresses may be generated from data content. As the costs of solid-state memory decrease, organizations can consider using systems that can store and process terabytes of data.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method for optimizing storage of data in a data storage replication system that includes a source site and a target site. The method includes, for a plurality of write requests received from the source site, determining transfer statistics corresponding to each of the write requests and updating a table with the transfer statistics. The method also includes grouping pages in the table having common transfer statistics, assigning at the target site a unique non-volatile memory express (NVMe) stream identifier (ID) to each of the groups, and identifying at the target site grouped pages based on the assigned NVMe stream ID. The method further includes selecting a storage optimization technique for each of the groups based on the common transfer statistics and storing the data of the write requests for each of the groups according to the selected optimization technique.

Another aspect may provide a system for optimizing storage of data in a data storage replication system that includes a source site and a target site. The system includes a memory having computer-executable instructions and a processor. The processor executes the computer-executable instructions. When executed by the processor, the computer-executable instructions cause the processor to perform operations. The operations include, for a plurality of write requests received from the source site, determining transfer statistics corresponding to each of the write requests and updating a table with the transfer statistics. The operations also include grouping pages in the table having common transfer statistics, assigning at the target site a unique non-volatile memory express (NVMe) stream identifier (ID) to each of the groups, and identifying at the target site grouped pages based on the assigned NVMe stream ID. The operations further include selecting a storage optimization technique for each of the groups based on the common transfer statistics and storing the data of the write requests for each of the groups according to the selected optimization technique.

Another aspect may provide a computer program product embodied on a non-transitory computer readable medium. The computer program product includes instructions that, when executed by a computer, causes the computer to perform operations for optimizing storage of data in a data storage replication system that includes a source site and a target site. The operations include, for a plurality of write requests received from the source site, determining transfer statistics corresponding to each of the write requests and updating a table with the transfer statistics. The operations also include grouping pages in the table having common transfer statistics, assigning at the target site a unique non-volatile memory express (NVMe) stream identifier (ID) to each of the groups, and identifying at the target site grouped pages based on the assigned NVMe stream ID. The operations further include selecting a storage optimization technique for each of the groups based on the common transfer statistics and storing the data of the write requests for each of the groups according to the selected optimization technique.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 1A is a block diagram of a content-based storage system having multi-level cache for deduplicated storage;

FIG. 7 is a table configured to facilitate the optimized data storage processes in accordance with an embodiment.

DETAILED DESCRIPTION

Figure 1B:
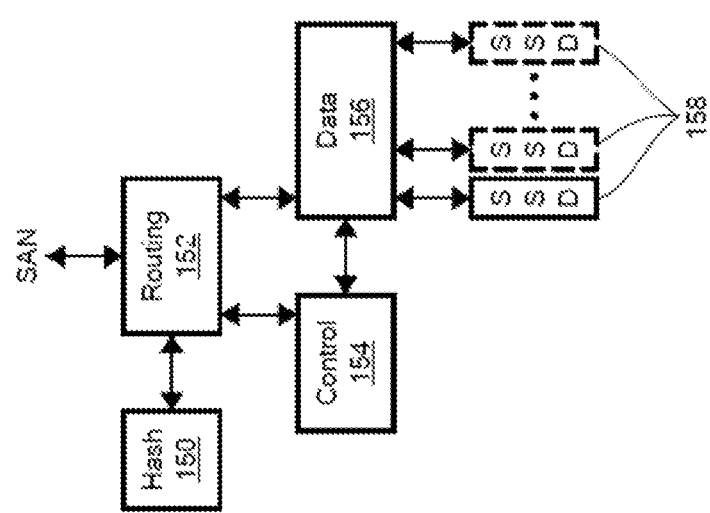
FIG. 1B illustrates further detail of the system of FIG. 1A.

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, the term "I/O request," or simply "I/O" or "JO" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives (e.g., the XtremIO all flash drive, available from DELL/EMC of Hopkinton Mass.). In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume, and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., I/O data) issued to a storage system, which may be used to maintain a duplicate storage system, and to roll back the duplicate storage system to a previous point in time. In some embodiments, each entry in a journal contains, apart from the I/O data itself, I/O metadata that can include information such as a volume identifier (ID), the I/O block offset within the volume, the I/O length, and a time stamp of the I/O.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, a "checkpoint" refers at least to an entity created by a checkpoint process, where the checkpoint process performs actions to preserve the state of an apparatus, system, or other entity (including software entities) at a particular time. Advantageously, a checkpoint includes information such as user data, the configuration of the apparatus, user metadata, and other information related to the internal state of the apparatus or system. For example, some storage systems (including XtremIO), in accordance with certain embodiments herein, also provide some kind of checkpoint feature, to provide an ability to preserve system state including user data and metadata at some defined point in time in order to restore this state after system malfunction or corruption. In certain embodiments, the checkpoint corresponds to a frozen, immutable re representation of the state of a system or apparatus at certain point in time, including user data, metadata, and the system configuration. In certain embodiments, the checkpoint is stored in a dedicated, reserved location within the system. In certain embodiments, the checkpoint is able to be created in an online, dynamic environment, where the checkpoint creation is transparent to entities having I/O interactions with the system.

For a file system, the accuracy and consistency of a file system is necessary to relate applications and data, so a checkpoint provides a way to provide periodic backup of file server state to allow system recovery in the event of faults or failures. When data corruption is detected, one of the checkpoints can be used for file system recovery. Similarly, a checkpoint, in a virtualization context, is a snapshot of the state of a virtual machine. Like a restore point in MICROSOFT WINDOWS operating systems, a checkpoint allows an administrator to restore an entity (e.g., a computer system, a file system, an application, a virtual machine, etc.) to a previous state. Checkpoints also can be used to create backups before conducting updates. Should an update fail or cause problems, an administrator can return the virtual machine to its state prior to the update. A recover action is used to return the system to the checkpoint state.

In some embodiments, logical block addressing" (LBA) refers to a linear addressing technique for specifying locations of blocks of data stored in storage system.

In certain embodiments, a RAID_stripe is a group of pages that are RAID self-consistent (data in a RAID_stripe can be recovered upon drive failure, independently of data residing on other RAID_stripes), and that RAID operation is performed atomically on this space. A RAID_stripe has stripe metadata (MD) associated with it describing its type (usually the block size it supports).

In some embodiments, a demoted LBA/hash refers to a LBA or hash that is not in memory (e.g., RAM), and thus requires SSD read operations to load the metadata).

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random I/O data. In an exemplary Content Addressable Storage (CAS) array (e.g., as described in U.S. Pat. No. 9,208,162 (hereinafter "'162 patent"), which is hereby incorporated by reference), data is stored in blocks, for example of 4 KB, where each block has a unique large hash signature, for example of 20 bytes, saved on Flash memory. In certain embodiments, a long hash is a value computed based on a data packet, such as a SHA-1 hash that is 20 bytes in length, but this is not limiting. As described herein, hash signatures (also referred to herein as full hashes or long hashes) are accessed by small in-memory handles (Called herein, interchangeably, hash handles, short hash handles or short hashes)), for example of 6 bytes. These handles are unique to each array, but not necessarily unique across arrays. A hash signature is unique, meaning that if two hash signatures are the same then their corresponding data blocks are the same.

When replicating between two CAS arrays, it is much more efficient to use hash signatures instead of sending the full block. If the target already has the data block corresponding to the hash signature, there is no need to send the corresponding data. However, reading the hash signatures may be expensive, and is wasteful if the target does not have the data (in this case it can be faster to send the data without a hash signature, and let the target calculate the hash signature.) While the hash handles are readily available without the need to read from Flash, since the hash handles are not unique, they cannot be easily used to check if a target contains a hash signature. In some implementations, hash handles are shortcuts for hash signatures, and can give a reliable hint of the existence of a hash signature in an array.

In some embodiments, NVMe, or NVM Express, refers to a logical device interface specification for accessing non-volatile storage media attached via a peripheral component interface express (PCIe) bus. NVM refers to non-volatile memory, or a flash memory, such as solid-state drive (SSD). In some embodiments, non-volatile memory over fabrics (NVMEoF) refers to a specification to enable non-volatile memory message-based commands to transfer data between hosts and targets (solid-state storage) or other systems and networks, such as Ethernet, Fibre Channel (FC) or InfiniBand.

In some embodiments, a recovery point objective (RPO) refers to a target or maximum time in which certain operations must be restored following some event, such as a loss or failure.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants is not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

In the embodiments described herein, a data storage optimization solution is provided for automatically generating NVMe stream IDs based on replication IO statistics that allow full leverage of NVMe stream capabilities. The solution need not rely on the stream information from the replication source and does not require additional metadata storage for the stream IDs. The embodiments described herein automatically generate and apply an NVMe stream ID on a replication write IO based on replication data transfer statistics, which in turn enables a backend system, e.g., a data module, to optimize the data placement for replication target objects.

FIG. 1A shows an illustrative content-based data storage system 100 with deduplication that may have multi-level data caches in accordance with embodiments of the disclosure. In the illustrated embodiment, first, second, third, and fourth nodes 102, 104, 106, 108 can be interconnected by a switch 110 via a switch interface 111. The first node 102 can include a control system 114 and a data system 116. In embodiments, separate data and control planes may be provided by the control and data systems 114, 116. The control system 114 may control execution of read and write commands to the storage devices 112. The data systems 116 may be connected to the storage devices 112 and, under control of a respective control system 114, may pass data to and/or from the storage devices via suitable storage drivers 113.

The data and/or control systems 114, 116 may retain extracts of the data stored in the storage devices 112. In embodiments, the data extracts may be generated by cryptographic hashing of the data content in the data blocks. In embodiments, the extracts may be used for content addressing of the data blocks to the physical storage devices 112.

The second node 104 can include a hash system 119 to generate the hash/extract, which can be referred to as a content fingerprint for the data blocks. The second node 104 can also include a routing system 118, along with a switch interface 111 and a SAN interface 115. The routing system 118 may terminate storage and retrieval operations and distribute commands to control systems 114 that may be selected for the operation in such a way as to retain balanced usage within the system. In the illustrated embodiment, the third node 106 can be similar to the first node 102 and the fourth node 108 can be similar to the second node 104.

The routing systems 118 may use the hash values calculated from data blocks to select control systems 114 for distribution. More particularly, selection of the control system 114 may use hash values, or may rely on the user address and not on the content (hash). The hash value may, however, be used for selecting the data system 116, and for setting the physical location for data storage within the data system.

In example embodiments, control modules 114 (also referred to as "C-Modules") can include a C cache 115 and the data modules 116 (also referred to as "D-Modules") can include a D cache 117. As explained more fully below, the C cache 115 can include addresses and address hashes, and the D cache 117 can include, for each bucket, physical data location information, a filter, a hash to physical location, and bucket information. The control modules may be referred to as a logical layer, holds the metadata for the logical layer, and implements the volume/snapshot operations. The data module manages the SSDs and implements one or more RAID algorithms as described further herein.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

FIG. 1B is an example of a system that can include a hash system 150 communicatively coupled to a routing system 152, which can be communicatively coupled to a control system 154 and a data system 156. The data system 156 can be communicatively coupled to any practical number of memory devices 158. The routing system 152 can route read/write commands from a host (not shown) to control and data systems 154, 156 for execution. In embodiments, the data content-based mapping to physical storage 158 can distribute workload relatively evenly and provide separation of the control and data paths. Read and write operations to the SSDs 158 can be used to generate priority values for the data blocks, as described more fully below.

Figure 2:
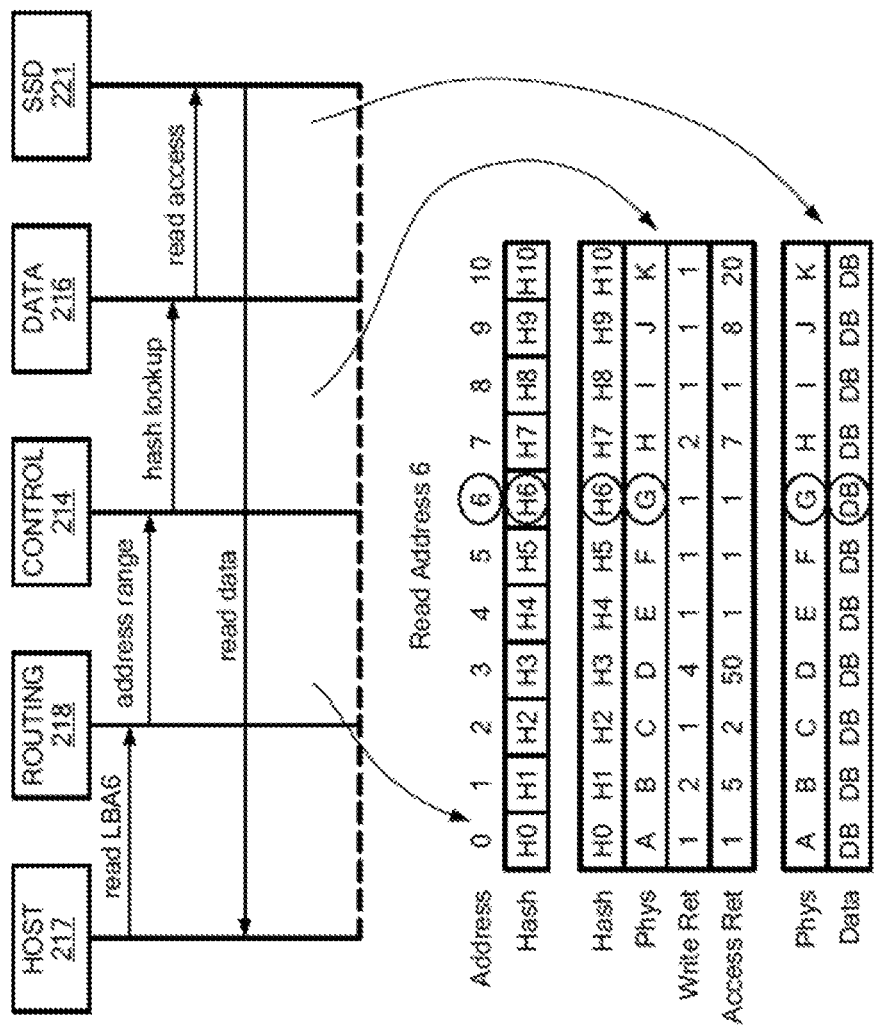
FIG. 2 is a flow diagram of read and write operations for the system of FIG. 1A.

FIG. 2 shows an example IO operation. A host 217 may issue a read command for a logical block address, which is shown as address "6," via a Fibre Channel or iSCSI port, for example. The routing system 218 may receive the read command and determine a requested address range in data blocks of 4K, for example, and pass the address information to the control system 214. The control system 214 may look up address 6 to obtain the hash value, which is shown as H6. This may be referred to as address-to-hash (A2H) lookup. The H6 hash value may be passed to the data system 216 which can perform a look up of the H6 hash value in a hash-to-physical address (H2P) table to read the physical address for the data. In the example, the physical address is shown as "G." The data system 216 can use the physical address to read the data block (DB) at physical address U in the SSD 221. A reference count can correspond to a number of times the hash value is referenced in physical storage. In embodiments, write reference information can be modified for each unique and/or deduplicated write and access reference information can be modified for each read and/or write access.

For a write operation from a host, the routing system 218 can receive the write data and can segment the data stream into data blocks and generate hash values for the data blocks. The hash value can be provided to the control system 214 to determine if the write data is unique. If unique, the hash value can be placed in an address mapping. The control system 214 can pass the hash value to the data system 216, which can assign the hash value to a physical address and write the data block(s) to the SSD at the physical address. In embodiments, the write reference information and/or the access reference information, can be modified, e.g., incremented.

If the hash value generated by the routing system 218 is not unique, the control system 214 can determine that data already exists at the physical address for the hash value. Since the data already exists, the data system 216 can increment the write reference information for the data block. In embodiments, the access reference information can also be modified. The data may not be written to the SSD. Deduplication may refer to a write operation where a hash for a data block is found not be unique and the non-unique data block is not written to physical storage. The reference count for the non-unique hash may be incremented.

Figure 3:
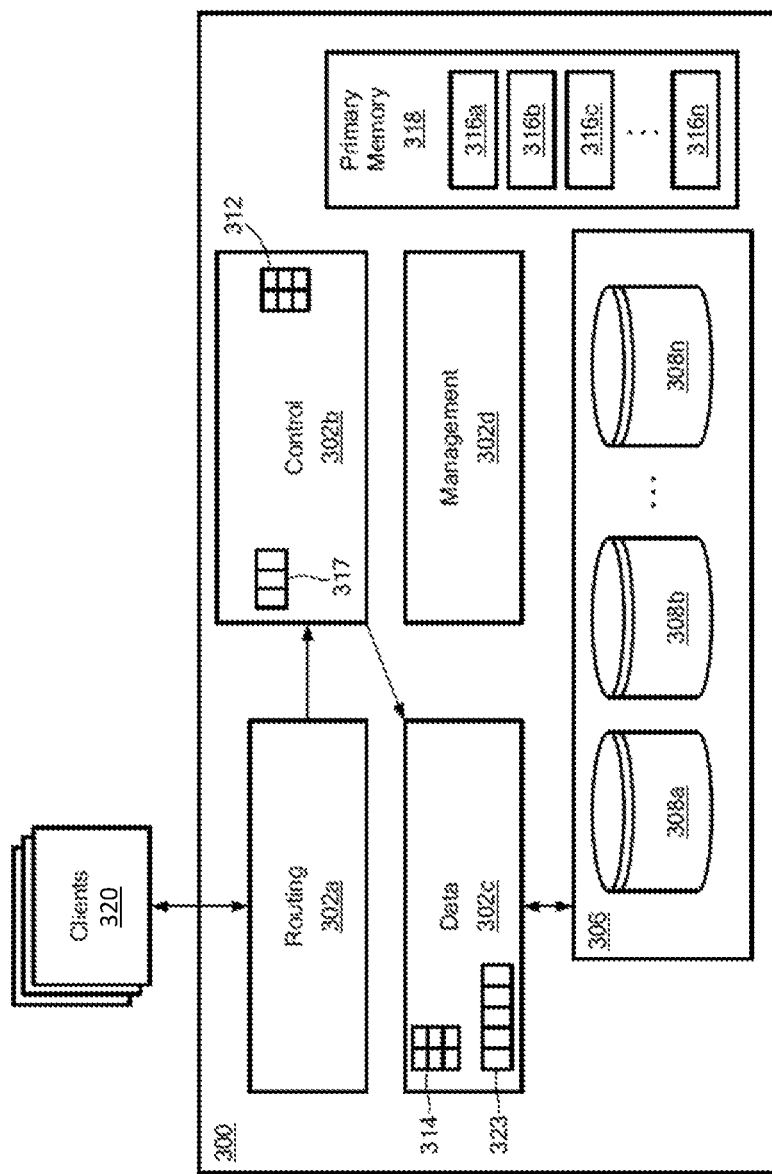
FIG. 3 is a block diagram of a content-based storage system having a control module with a first cache and a data module with a second cache.

FIG. 3 shows a storage system 300 according to an illustrative embodiment of the disclosure. The storage system 300 may be the same as or similar to a node within the distributed storage system of FIG. 1A. The storage system 300 may include a plurality of modules 302a-302d (generally denoted 302 herein), a storage array 306 comprising a plurality of storage devices 308a . . . 308n (generally denoted 308 herein), and a primary memory 318. 316 not described. In some embodiments, the storage devices 308 may be provided as solid-state devices (SSDs).

As described further herein, the storage system 300 also can include a C (also called logical) cache 317 and a D (also called physical) cache 323. The C cache 317 and/or the D cache 323 can, in certain embodiments, be physical devices configured to store certain data so that future requests for that data can be served faster. Although the C cache 317 and D cache 323 are shown as being part of the storage system, it is understood that the C cache 317 and/or D cache 323 can be located anywhere such that they are accessible quickly to the storage system. Data that is stored within a cache might include data values that have been computed earlier or duplicates of original values that are stored elsewhere. If the requested data is contained in the cache (herein referred to as a cache hit), this request can be served by simply reading the cache, which is comparatively faster than going to other types of memory. On the other hand, if the requested data is not contained in the cache (herein referred to as a cache miss), the data may have to be to be recomputed or fetched from its original storage location, which is comparatively slower. Hence, the greater the number of requests that can be served from the cache, the faster the overall system performance becomes.

The primary memory 318 can be any type of memory having access times that are faster compared to the storage devices 308. In some embodiments, primary memory 318 may be provided as dynamic random-access memory (DRAM). In certain embodiments, primary memory 318 may be provided as synchronous DRAM (SDRAM). In one embodiment, primary memory 318 may be provided as double data rate SDRAM (DDR SDRAM), such as DDR3 SDRAM.

As described above, the control module (also referred to herein as control subsystem) 302b may be configured to maintain a mapping between I/O addresses associated with data and the corresponding chunk hashes. As shown in FIG. 3, this mapping may be maintained using a data structure 312, referred to herein as an "I/O address to chunk hash mapping table" or "A2H table," (also known as A→H table) according to some embodiments. In one embodiment, I/O addresses may be logical addresses used by clients 320 to access data within the storage system 300.

As also described above, the data module (also referred to herein as data subsystem) 302c may be configured to maintain a mapping between chunk hashes and physical storage addresses (i.e., storage locations within the storage array 306 and/or within individual storage devices 308). This mapping may be maintained using a data structure 314, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout. In certain embodiments, the H2P table is maintained to route data with different hashes to different D modules. The data subsystem 302c may be also be configured to read and write data from/to the storage array 306 (and/or to individual storage devices 308 therein).

As described above, in a content addressable storage system, data is stored in blocks, for example, 16 KB, 8 KB, 4 KB, etc., where each block has a universally unique large hash signature, for example of 20 bytes, which can be saved to disk, e.g., Flash memory. As described herein, hash signatures may be accessed by small in-memory handles (referred to herein as short hash handles, hash handles, or short hashes), for example of 6 bytes. These short hashes may be unique to each volume/array, but not necessarily unique across volumes/arrays. Additional information relating to hash-based replication, computation of hashes, generation and use of short hash handles can be found in U.S. Pat. No. 9,378,106 ("Hash Based Replication"); U.S. Pat. No. 9,208,162 ("Generating a Short Hash Handle") and U.S. Pat. No. 9,396,243 ("Hash-Based Replication Using Short Hash Handle and Identity Bit"), each of which is hereby incorporated by reference.

In embodiments, address to hash mapping (A2H) maps an address inside a volume to the short hash value of its data. In embodiments, metadata can include for each address the hash value of the content. If the basis for deduplication is 16 KB, then the metadata holds for each address the short hash value of the data to which the address points. In cases where access to the volume is in larger chunks than the size of the basic hash value, the metadata for the address space can be readily cached.

As also noted above, hash to physical disk locations can include for each hash key (e.g., 6 bytes) the location on the disk, and the reference count. Where a storage system uses hash keys of 6 bytes, there may be collisions of data generating the same hash. If there is a collision, a new hash key from a different hash address space is generated for the data when the data is written. This means that the hash to physical disk location table may search for a hash value every time a new write arrives. If the write has the same hash value, there is a need to check the long hash value, and verify if there is a hash collision, or whether it is actually the same data. This means that during every write if the hash to physical disk location table is not in the system memory, there may a need to fetch the metadata of the hash from the disk to verify if such a hash exists. It will be appreciated that metadata structures may consume most of system memory, e.g., DRAM, in the storage system, so that the metadata limits the total size of the storage system.

Figure 4:
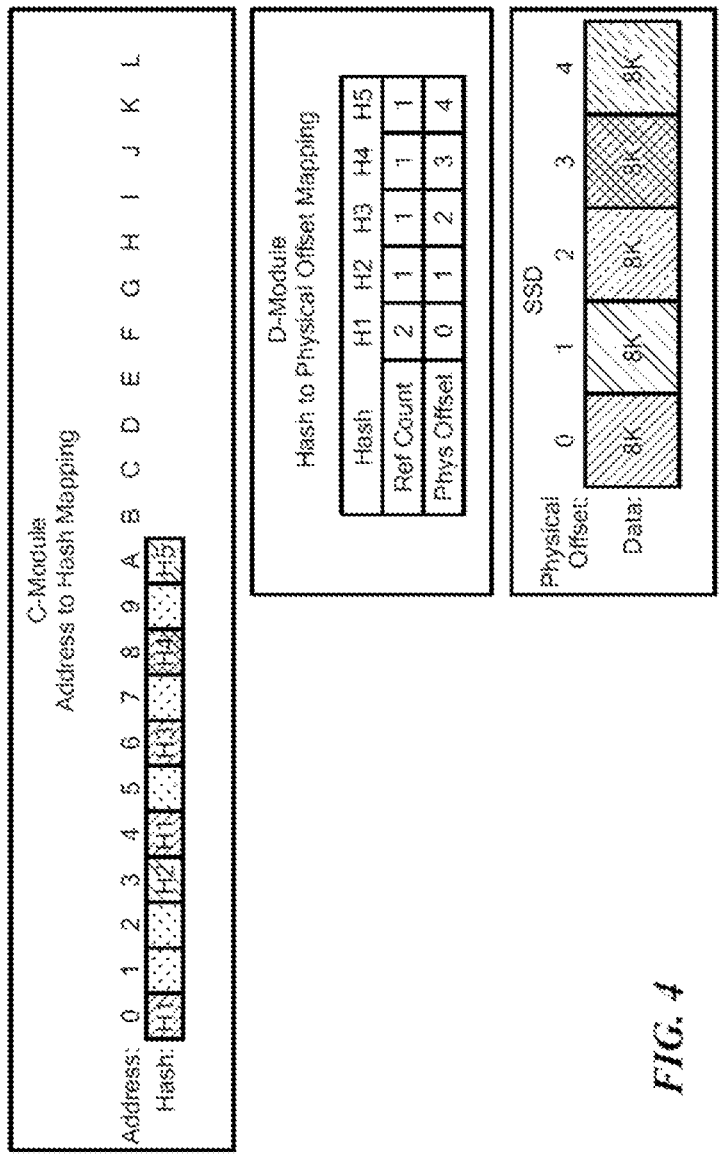
FIG. 4 is a schematic representation of address-to-hash (A2H) mapping in a control module and hash-to-physical (H2P) mapping in a data module for a content-based storage system.

FIG. 4 shows an example control or C module address to hash (A2H) mapping 400. As can be seen, as data blocks arrive, the content for the address is hashed to generate H1, H2, H3, H4, H5, as shown. It should be noted that H1 appears twice and is deduplicated. The D-module includes a hash to physical (H2P) mapping showing the physical offset of the data along with a reference count indicative of how many times a given hash value occurs. It will be appreciated that a particular hash value having a high reference count will likely be accessed more often than hash values having a low reference count. In embodiments, a reference count is incremented each time the hash value is generated in a volume. Thus, higher reference count hash values may be preferred for placement in D cache over low reference count hash values. It can be seen that the physical offset corresponds to the order in which a unique hash value is generated. For example, H3 is shown with an offset value of 2 since a second H1 value was deduplicated.

The NVMe protocol supports the concept of multiple JO streams which allows a host to group IOs having certain associations. This capability enables a flash storage array, such as XtremIO, to store associated data with similar life spans and access patterns in an optimal manner, thus improving JO performance and alleviating SSD drive aging, e.g., by reducing fragmentation. Once data is persisted on the SSD drives, however, the stream information is usually no longer needed in the flash storage array. This presents a challenge of how to replicate or maintain the optimal data layout at a replication target system for the storage objects.

One solution would be to save the stream ID information to the volume mapping metadata and replicate the stream ID information to the target system along with the data. However, this adds to the metadata storage footprint and may create issues such as protocol compatibility, inter-system stream IO namespace management, etc.

In addition, many applications generate data loads with very different life spans and update patterns. One such example is a general-purpose database in which the transaction logs' and rollback logs' storage objects are sequentially updated at a high frequency, but the actual database data is randomly updated at a much lower frequency. In embodiments described herein, an NVMe stream ID is generated and used to optimize the data placement at the source system by grouping log data and database data separately. If replication writes are agnostic to NVMe streams, the log data and the database data could all mingle together at the target system and may trigger de-fragmentation and garbage collection that could otherwise be avoided.

The embodiments described herein provide a solution that automatically generates NVMe stream IDs based on replication IO statistics. This approach allows full leverage of NVMe stream capability, does not rely on the stream information from the replication source, and does not require additional metadata storage for the stream IDs.

In particular, the data storage optimization solution automatically generates and applies an NVMe stream ID on a replication write IO based on replication data transfer statistics, which in turn enables the backend data module (e.g., subsystem 302C of FIGS. 3 and 502C of FIG. 5 below) to optimize the data placement for replication target objects.

In some storage systems, such as XtremIO, hash-based low recovery point objective (RPO) native replication provides useful statistical information that can be analyzed. For example, transfer statistics of a short hash handle and a long hash digest provide information on the extent to which datasets overlap between the source and target storage systems. In embodiments, hash hits may not be considered in generating the stream ID as they merely trigger reference count increases of existing data. Transfer statistics of full pages provide information about the frequency of the data updates of particular logical address ranges, and the data addresses that tend to update at the same time.

Using these statistics, data can be grouped having similar update frequencies and life spans, stream IDs can be applied to different groups, and the data can be passed down to D (data) modules for persistent storage. For snapshot-based async replication, a dirty tree of the A2H metadata can be leveraged for acquiring the transfer statistics. The more frequently updated address ranges have more shadowed dirty bits along the snap tree.

Figure 5:
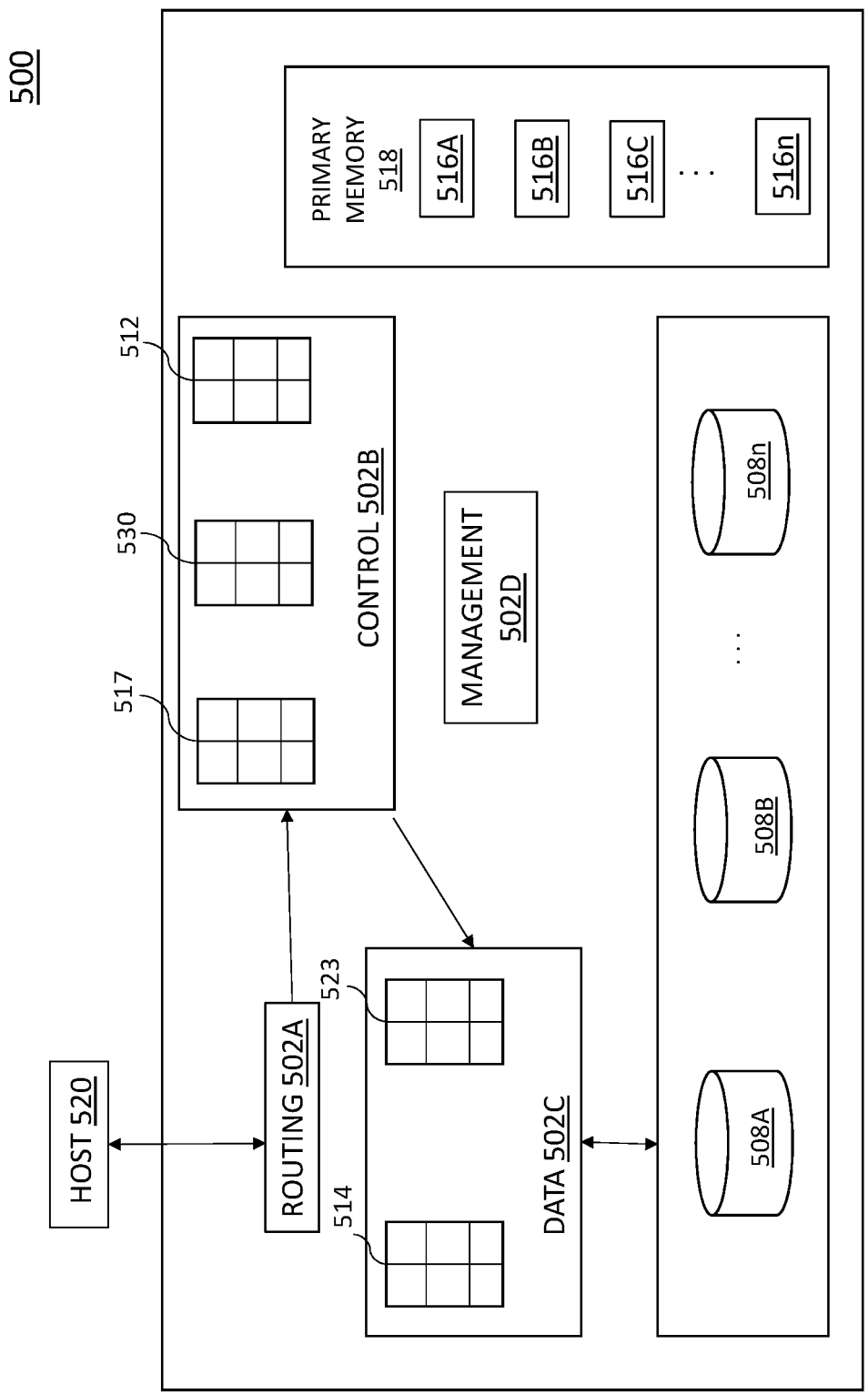
FIG. 5 is a block diagram of a storage system for optimizing data storage using replication statistics to automatically generate stream identifiers in accordance with an embodiment.

FIG. 5 shows a replication storage system 500 according to an illustrative embodiment. The storage system 500 includes a target side replication system. The storage system 500 may be the same as or similar to the system 300 of FIG. 3 and/or one or more nodes within the distributed storage system of FIG. 1A. The storage system 500 may include a host system 520 communicatively coupled to a plurality of modules 502A-502D (generally denoted 502 herein and also referred to as subsystems), a storage array 506 comprising a plurality of storage devices 508A . . . 508n (generally denoted 508 herein), and a primary memory 518. In some embodiments, the storage devices 508 may be provided as solid-state devices (SSDs).

As described further herein, the storage system 500 also can include a C (also called logical) cache 517 and a D (also called physical) cache 523. The C cache 517 and/or the D cache 523 can, in certain embodiments, be physical devices configured to store certain data so that future requests for that data can be served faster.

The primary memory 518 can be any type of memory having access times that are faster compared to the storage devices 508. In some embodiments, primary memory 518 may be provided as dynamic random-access memory (DRAM). In certain embodiments, primary memory 518 may be provided as synchronous DRAM (SDRAM). In one embodiment, primary memory 518 may be provided as double data rate SDRAM (DDR SDRAM), such as DDR3 SDRAM.

As described above, the control subsystem 502B may be configured to maintain a mapping between I/O addresses associated with data and the corresponding chunk hashes. As shown in FIG. 5, this mapping may be maintained using a data structure 512, referred to herein as an "I/O address to chunk hash mapping table" or "A2H table," (also known as A→H table) according to some embodiments. In one embodiment, I/O addresses may be logical addresses used by the host system 520 to access data within the storage system 500. In addition, in an embodiment, the control subsystem 502B may be configured to maintain a hot spot list 530 of addresses for use in implementing data storage optimization. The hot spot list 530 may be configured as a table, which is described further in FIG. 7.

As also described above, the data subsystem 502C may be configured to maintain a mapping between chunk hashes and physical storage addresses (i.e., storage locations within the storage array 506 and/or within individual storage devices 508). This mapping may be maintained using a data structure 517, referred to herein as a "hash to physical address mapping table" or "H2P table," or "H→P table," In certain embodiments, the H2P table is maintained to route data with different hashes to different D modules. The data subsystem 502C may be also be configured to read and write data from/to the storage array 506 (and/or to individual storage devices 508 therein).

In embodiments, the data storage optimization solution generates a hot spot list, which may take the form of a table and may include rows for address ranges for volume pages and columns for tracking update frequencies and update timestamps for changes made to corresponding address ranges. A table 700 with sample data is shown and described in FIG. 7. The embodiments utilize this table to implement the processes described herein. Replication statistics may be collected and analyzed within the C module 502B using, for example, information from the A2H table. The C module 502B attaches appropriate stream IDs to write requests before sending down to the D module 502C, which is responsible for sending the data to persistent storage (e.g., one or more SSDs 508A-508n).

Figure 6A:
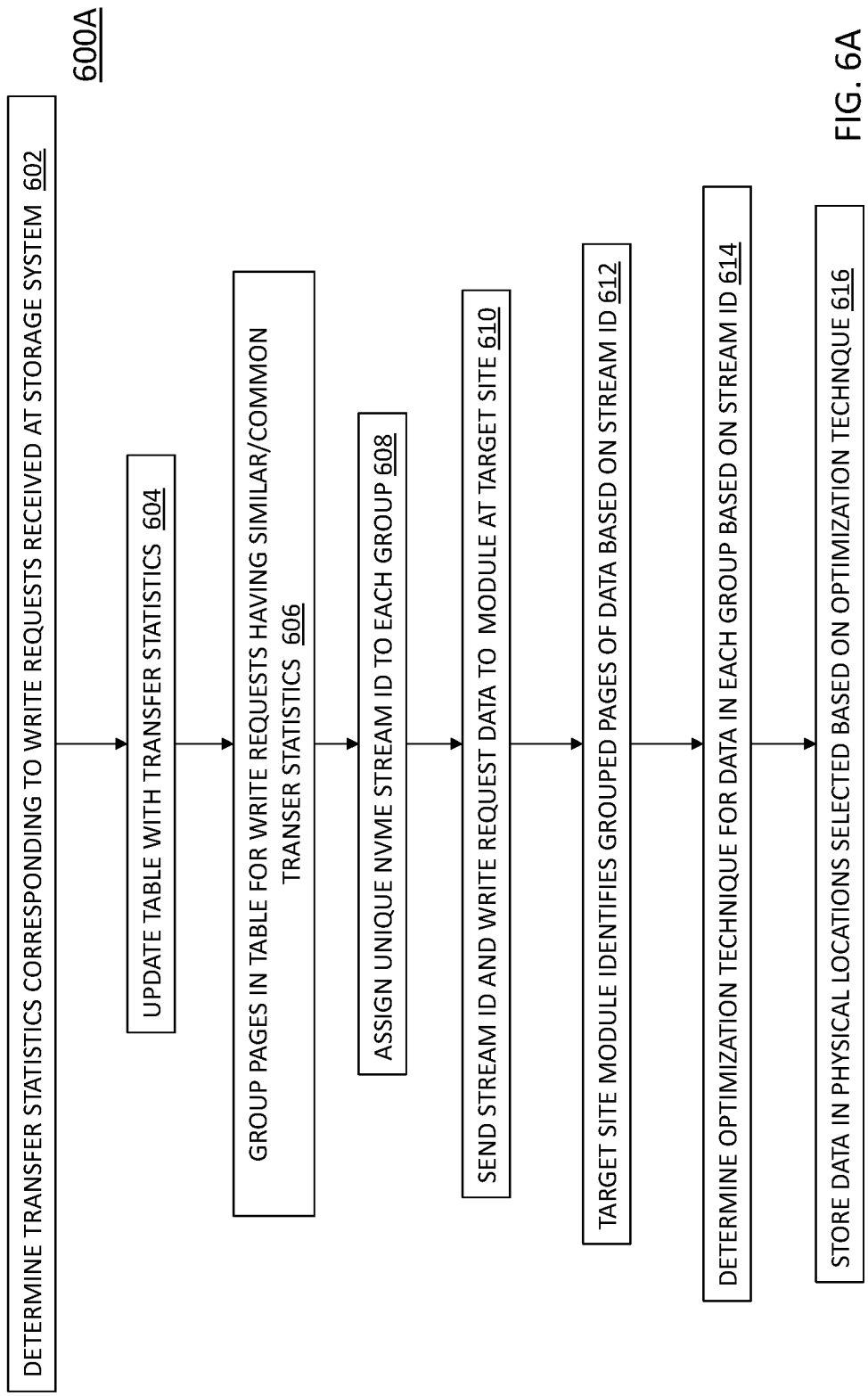
FIGS. 6A-6B are flow diagrams describing processes for optimizing data storage using replication statistics to automatically generate stream identifiers in accordance with an embodiment.
Figure 6B:
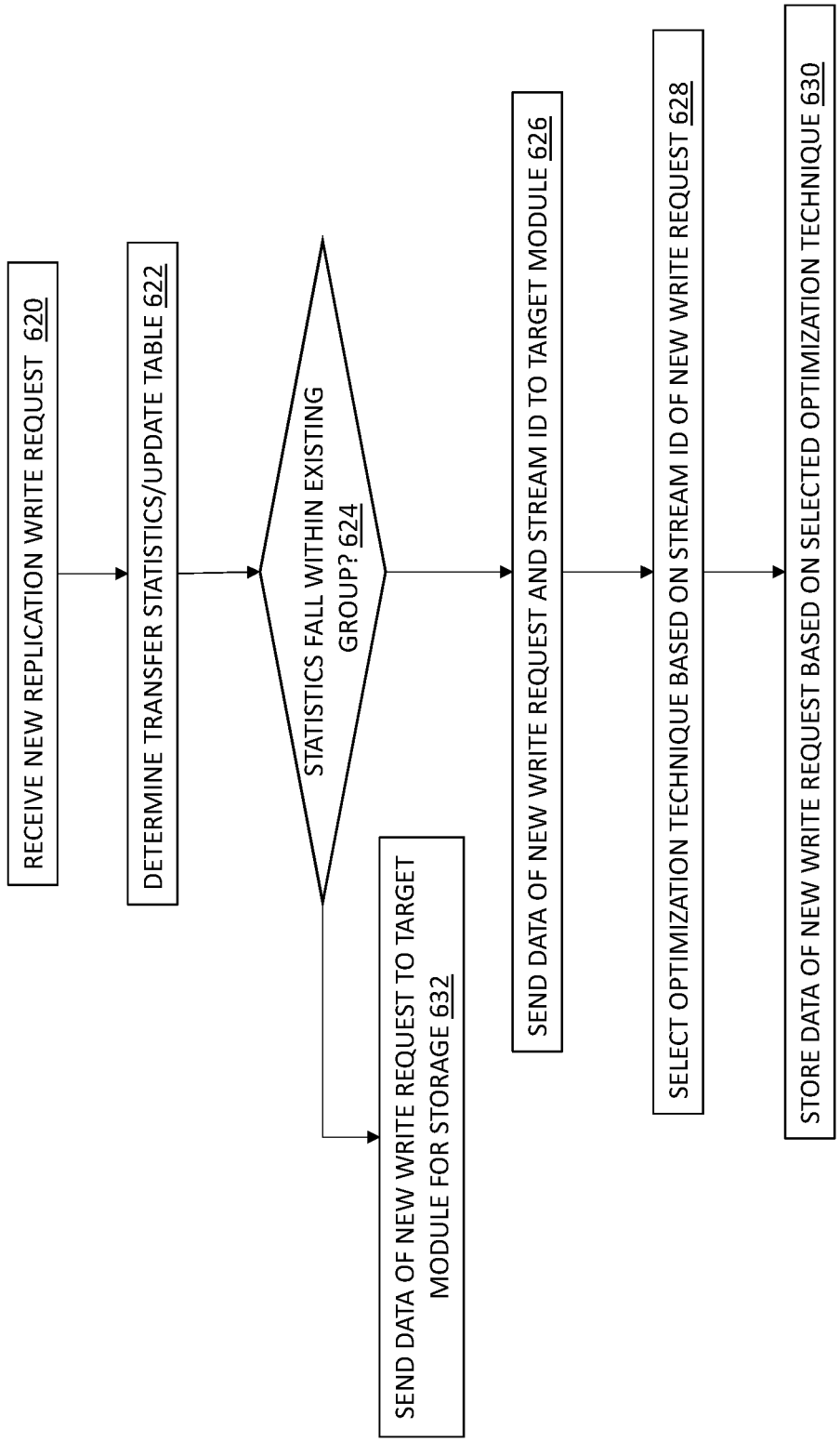

Turning now to FIGS. 6A, 6B, and 7, a process 600A-600B and table 700 for implementing the data storage optimization solution will now be described in exemplary embodiments. Process 600A provides a technique for creating/populating the table for histories of write requests and transfer statistics collected on the write requests. Process 600B illustrates utilization of the table 700 during a replication session in which one or more new write requests are received. The processes of 600A-600B further assume that cold data is not tracked via the table as it is not updated frequently, and thus, it is less likely to trigger decreased reference counts, page deletions, and defragmentation on SSD drives.

For a plurality of write requests received at the source site, the process 600A determines transfer statistics corresponding to each of the write requests in block 602. In block 604, the table 700 is updated with these transfer statistics. The processes track, via the table 700, the write requests based on address ranges associated with the write requests. As shown in FIG. 7, the address ranges are shown in column 702.

In embodiments, the transfer statistics may include the frequency of updates for the address ranges. The frequency information may be obtained in various ways. For example, in an asynchronous replication session, the frequency of updates may be determined by assessing modifications made to a dirty tree of address-to-hash metadata (e.g., an A2H metadata tree 512 of the target side C module 502B in FIG. 5 is checked to see if the page offset has been updated multiple times along a snap chain). In a further embodiment, transfer statistics may include the size of an address range for each of the write requests.

In block 606, the process 600A groups pages (address ranges) in the table 700 for write requests having similar or common transfer statistics. This grouping enables identification of 'hot data' having similar update cadences. In block 608, the process 600A assigns, at the target site (e.g., within the C module 502B), a unique non-volatile memory express (NVMe) stream identifier (ID) to each of the groups. As shown in FIG. 7, a column 708 illustrates, e.g., the same stream ID assigned to address ranges corresponding to pages 1, 4, and 5 since their transfer statistics in columns 704 and 706 reveal similar update frequency statistics. In an embodiment, the NVMe stream ID may be generated internally at the target site.

In block 610, the process 600A, for each of the groups, sends the stream ID and data for each write request of the group to the D module 502C of the target site. In an embodiment, the D module 502C receives the write request data and stream ID from the C module 502B.

In block 612, D module at the target site identifies the grouped pages based on the assigned stream ID and selects a storage optimization technique for each of the groups based on the stream ID and corresponding common transfer statistics in block 614.

In block 616, the target site stores the data in persistent storage according to the selected optimization technique.

Turning now to FIG. 6B, the process 600B illustrates optimized storage of data for a new write request, e.g., during an active replication cycle. In block 622, the target site receives a new write request and determines the transfer statistics for the new request. In an embodiment, the write request may be received from the host system 520 by the control module 502B.

In block 624, the process 600B determines whether the transfer statistics of the new write request fall within one of the existing groups established for the table 700. If so, the process 600B sends the data of the new write request to a module (e.g., D module) at the target site with the assigned corresponding NVMe stream in block 626.

In block 628, the target site module selects a storage optimization technique for the new write request based on the stream ID. In block 630, the target site module stores the data of the new write request according to the selected optimization technique.

Turning back to block 624, if the transfer statistics do not fall within one of the established groups of the table 700, in block 632, the process 600B sends the data of the new write request to the target site module without a stream ID.

Figure 8:
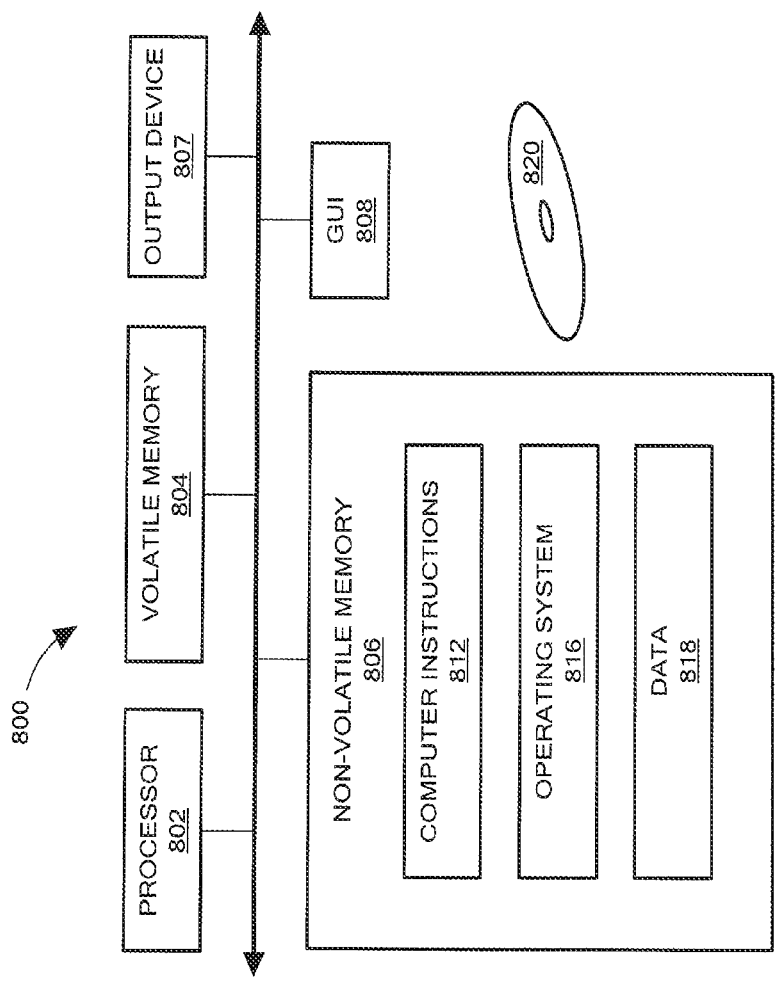
FIG. 8 is a block diagram of an illustrative computer that can perform at least a portion of the processing described herein.

FIG. 8 shows an exemplary computer 800 (e.g., physical or virtual) that can perform at least part of the processing described herein. The computer 800 includes a processor 802, a volatile memory 804, a non-volatile memory 806 (e.g., hard disk or flash), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method for optimizing storage of data in a data storage replication system including a source site and a target site, comprising:
   for a plurality of write requests received from the source site:
      determining transfer statistics corresponding to each of the write requests; and
      updating a table with the transfer statistics;
   grouping pages in the table having common transfer statistics;
   assigning, at the target site, a unique non-volatile memory express (NVMe) stream identifier (ID) to each of the groups;
   identifying, at the target site, grouped pages based on the assigned NVMe stream ID;
   selecting a storage optimization technique for each of the groups based on the common transfer statistics; and
   storing the data of the write requests for each of the groups according to the selected optimization technique;
   wherein the transfer statistics include a frequency of updates for the address ranges, the frequency of updates determined, in an asynchronous replication process, by modifications made to a dirty tree of address-to-hash metadata.

2. The method of claim 1, further comprising:
   receiving a new write request;
   determining transfer statistics for the new write request;
   determining whether the transfer statistics of the new write request fall within one of the groups of the table;
   upon determining the transfer statistics of the new write request falls within one of the groups of the table:
      assigning the corresponding NVMe stream ID for the one of the groups to the new write request;

selecting, at the target site, a storage optimization technique for the write request based on the corresponding NVMe stream ID; and storing the data of the new write request according to the selected storage optimization technique for the new write request.

3. The method of claim 1, further comprising tracking, via the table, the write requests based on address ranges associated with the write requests.

4. The method of claim 3, wherein the transfer statistics include a size of each of the write requests.

5. The method of claim 1, further comprising generating the NVMe stream ID internally at the target site.

6. A system for optimizing storage of data in a data storage replication system including a source site and a target site, comprising:

a memory comprising computer-executable instructions; and a processor executing the computer-executable instructions, the computer-executable instructions when executed by the processor cause the processor to perform operations comprising:

for a plurality of write requests received from the source site:

determining transfer statistics corresponding to each of the write requests; and updating a table with the transfer statistics;

grouping pages in the table having common transfer statistics;

assigning, at the target site, a unique non-volatile memory express (NVMe) stream identifier (ID) to each of the groups;

identifying, at the target site, grouped pages based on the assigned NVMe stream ID;

selecting a storage optimization technique for each of the groups based on the common transfer statistics; and storing the data of the write requests for each of the groups according to the selected optimization technique;

wherein the transfer statistics include a frequency of updates for the address ranges, the frequency of updates determined, in an asynchronous replication process, by modifications made to a dirty tree of address-to-hash metadata.

7. The system of claim 6, wherein the operations further comprise:

receiving a new write request;

determining transfer statistics for the new write request;

determining whether the transfer statistics of the new write request fall within one of the groups of the table;

upon determining the transfer statistics of the new write request falls within one of the groups of the table:

assigning the corresponding NVMe stream ID for the one of the groups to the new write request;

selecting, at the target site, a storage optimization technique for the write request based on the corresponding NVMe stream ID; and storing the data of the new write request according to the selected storage optimization technique for the new write request.

8. The system of claim 6, wherein the operations further comprise tracking, via the table, the write requests based on address ranges associated with the write requests.

9. The system of claim 8, wherein the transfer statistics include a size of each of the write requests.

10. The system of claim 6, wherein the operations further comprise generating the NVMe stream ID internally at the target site.

11. A computer program product embodied on a non-transitory computer readable medium, the computer program product including instructions that, when executed by a computer causes the computer to perform operations for optimizing storage of data in a data storage replication system including a source site and a target site, the operations comprising:

for a plurality of write requests received at the source site:

determining transfer statistics corresponding to each of the write requests; and updating a table with the transfer statistics;

grouping pages in the table having common transfer statistics;

assigning, at the target site, a unique non-volatile memory express (NVMe) stream identifier (ID) to each of the groups;

identifying, at the target site, grouped pages based on the assigned NVMe stream ID;

selecting a storage optimization technique for each of the groups based on the common transfer statistics; and storing the data of the write requests for each of the groups according to the selected optimization technique;

wherein the transfer statistics include a frequency of updates for the address ranges, the frequency of updates determined, in an asynchronous replication process, by modifications made to a dirty tree of address-to-hash metadata.

12. The computer program product of claim 11, wherein the operations further comprise:

receiving a new write request;

determining transfer statistics for the new write request;

determining whether the transfer statistics of the new write request fall within one of the groups of the table;

upon determining the transfer statistics of the new write request falls within one of the groups of the table:

assigning the corresponding NVMe stream ID for the one of the groups to the new write request;

selecting, at the target site, a storage optimization technique for the write request based on the corresponding NVMe stream ID; and storing the data of the new write request according to the selected storage optimization technique for the new write request.

13. The computer program product of claim 11, wherein the operations further comprise tracking, via the table, the write requests based on address ranges associated with the write requests.

14. The computer program product of claim 13, wherein the transfer statistics include a size of each of the write requests.

* * * * *